United States Patent
Nishitani et al.

(10) Patent No.: US 6,649,718 B2
(45) Date of Patent: Nov. 18, 2003

(54) SURFACE ACTIVE AGENT COMPOSITION AND EMULSIFYING AGENT COMPOSITION FOR AQUEOUS RESIN DISPERSION

(75) Inventors: Toshiyuki Nishitani, Oumihatiman (JP); Toshikazu Nabeshima, Kyoto (JP); Hiroyuki Kurahashi, Kyoto (JP)

(73) Assignee: Dai-Ichi Kogyo Seiyaku Co., Ltd., Kotyo (JP)

( * ) Notice: Subject to any disclaimer, the term of this patent is extended or adjusted under 35 U.S.C. 154(b) by 165 days.

(21) Appl. No.: 10/054,467

(22) Filed: Nov. 13, 2001

(65) Prior Publication Data

US 2003/0139552 A1 Jul. 24, 2003

(51) Int. Cl.$^7$ ............................................. C08F 230/04
(52) U.S. Cl. .................. 526/240; 526/278; 526/287; 526/311
(58) Field of Search ................. 526/240, 278, 526/287, 311

(56) References Cited

U.S. PATENT DOCUMENTS

| | | | | |
|---|---|---|---|---|
| 3,875,202 A | * | 4/1975 | Steckler ........................ | 558/34 |
| 4,560,599 A | * | 12/1985 | Regen ........................ | 428/36.1 |
| 4,574,130 A | * | 3/1986 | Potter et al. ................. | 523/111 |

\* cited by examiner

Primary Examiner—Bernard Lipman

(74) Attorney, Agent, or Firm—Marshall, Gerstein & Borun LLP

(57) ABSTRACT

A surface active agent composition is prepared including: a polymerizable monomer surface active agent and a polymerizable dimer surface active agent represented by the following chemical formula. In the following chemical formula, $R^1$s each are independently an alkyl group having 8 to 30 carbon atoms, $R^2$s each are independently hydrogen or a methyl group, As each are independently an alkylene group having 2 to 4 carbon atoms or a substituted alkylene group, and ns each are independently an integer from 0 to 200. The surface active agent composition is capable of providing for an emulsion exhibiting excellent mechanical stability and polymerization stability, which in turn is capable of forming a film having sufficiently high adhesion and water resistance.

Chemical formula 1

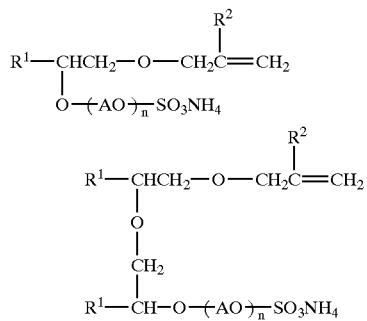

18 Claims, 2 Drawing Sheets

SURFACE ACTIVE AGENT COMPOSITION AND EMULSIFYING AGENT COMPOSITION FOR AQUEOUS RESIN DISPERSION

TECHNICAL FIELD OF THE INVENTION

The present invention relates to surface active agent compositions, and emulsifying agent compositions for aqueous resin dispersion and, more particularly, to a surface-active agent composition and an emulsifying agent composition for aqueous resin dispersion which are suitable for use in aqueous-system emulsion polymerization or the like of ethylenic unsaturated monomers.

DESCRIPTION OF THE RELATED ART

As emulsifying agents for emulsion polymerization, there are conventionally used anionic surface-active agents such as alkylsulfuric ester, alkylbenzenesulfonate, dialkylsulfosuccinate and alkyl(aryl) polyoxyalkylene ether sulfuric ester, and nonionic surface-active agents such as alkyl(aryl) polyoxyalkylene ether, polyoxyethylene-polyoxypropylene block copolymer and polyoxyethylenesorbitan fatty acid ester, either alone or as mixture. The stability of an emulsion prepared with use of such a conventional emulsifying agent and the properties or the like of a film prepared from such an emulsion are not necessarily satisfactory enough and, hence, many problems are left unsolved. Specifically, emulsions prepared with use of such conventional emulsifying agents have problems in relation to polymerization stability, mechanical stability, chemical stability, freezing and thawing stability, pigment miscibility, shelf stability and the like. The mechanical stability problem, in particular, is left as a matter to be improved. Further, when a polymer film is formed from such an emulsion, an emulsifying agent used is left as liberated in the polymer film and, hence, problems including inferior water resistance and adhesion and the like arise with such polymer films. Furthermore, since drain resulting when an emulsion is destroyed by salting-out or by any other means to harvest a polymer contains much emulsion and hence causes rivers to be polluted, much labor is required for removal of emulsion.

With a view to solving such problems essential to conventional emulsifying agents, a number of emulsifying agents that are generally called reactive emulsifying agents have been proposed. For example, anionic reactive emulsifying agents include those disclosed in Japanese Patent Examined Gazette No. SHO 46-12472, Japanese Patent Laid-Open Gazette No. SHO 54-144317, Japanese Patent Examined Gazette No. SHO 46-34894, Japanese Patent Examined Gazette No. SHO 56-29657, Japanese Patent Laid-Open Gazette No. SHO 51-30285, Japanese Patent Examined Gazette No. SHO 49-46291, and the like; and nonionic reactive emulsifying agents include those disclosed in Japanese Patent Laid-Open Gazette No. SHO 56-28208, Japanese Patent Laid-Open Gazette No. SHO 50-98484, Japanese Patent Laid-Open Gazette No. HEI 1-99638, and the like. Though attempts have been made to use these reactive emulsifying agents for emulsion polymerization of various monomers, use of an emulsifying agent comprising such a reactive emulsifying agent alone often provides insufficient stability at the time of emulsion polymerization. Thus, such reactive emulsifying agents involve a problem that their inherent performance is not sufficiently exhibited; for example, polymerization does not proceed smoothly unless a reactive emulsifying agent is used in combination with a conventional emulsifying agent.

An emulsifying agent for aqueous resin dispersion described in Japanese Patent Laid-Open Gazette No. HEI 1-99638 is known as an agent that is capable of solving such a problem. Use of this emulsifying agent makes it possible to resolve the aforementioned problem considerably. With this emulsifying agent for aqueous resin dispersion, however, some emulsions exhibit insufficient mechanical stability and polymerization stability, or some films made from the emulsion have insufficient adhesion and water resistance.

Accordingly, it is an object of the present invention to provide a surface-active agent composition and an emulsifying agent composition for aqueous resin dispersion which are capable of providing for an emulsion exhibiting satisfactory mechanical stability and polymerization stability, which in turn is capable of sufficiently enhancing adhesion property and water resistance property when used to form films.

SUMMARY OF THE INVENTION

A surface-active agent composition according to the present invention comprises: a polymerizable monomer surface active agent represented by the general formula (I) as chemical formula 1 and a polymerizable dimer surface active agent represented by the general formula (II) as chemical formula 2:

Chemical formula 1

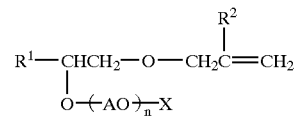

(I)

Chemical formula 2

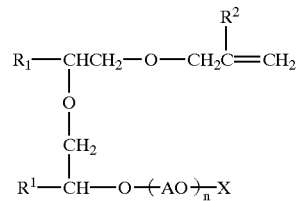

(II)

wherein, in chemical formulae 1 and 2, $R^1$s each are independently an alkyl group having 8 to 30 carbon atoms, $R^2$s each are independently hydrogen or a methyl group, As each are independently an alkylene group having 2 to 4 carbon atoms or a substituted alkylene group, ns each are independently an integer from 0 to 200, and Xs each are independently hydrogen or one of substituents represented by the chemical formula 3:

Chemical formula 3

—X:

—SO$_3$M (a)

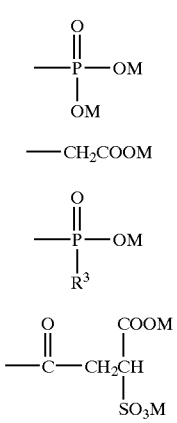

(b)

(c)

(d)

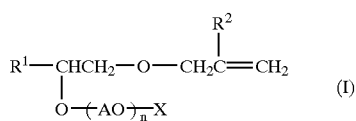

(e)

wherein, in chemical formula 3, Ms each are independently an alkali metal, NH$_4$ or an alkanolamine residue, and R$^3$s each are independently a residue other than X in chemical formula 1 or 2.

An emulsifying agent composition for aqueous resin dispersion according to the present invention comprises: a polymerizable monomer surface active agent represented by the general formula (I) as chemical formula 4:

Chemical formula 4

$$R^1-CHCH_2-O-CH_2C(R^2)=CH_2$$
$$\qquad |$$
$$\quad O-(AO)_n-X \qquad (I)$$

and a polymerizable dimer surface active agent represented by the general formula (II) as chemical formula 5:

Chemical formula 5

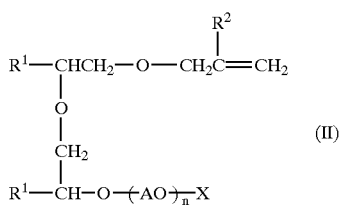

wherein, in chemical formulae 4 and 5, R$^1$s each are independently an alkyl group having 8 to 30 carbon atoms, R$^2$s each are independently hydrogen or a methyl group, As each are independently an alkylene group having 2 to 4 carbon atoms or a substituted alkylene group, ns each are independently an integer from 0 to 200, and Xs each are independently hydrogen or one of substituents represented by the chemical formula 6:

Chemical formula 6

—X:

—SO$_3$M (a)

(b)

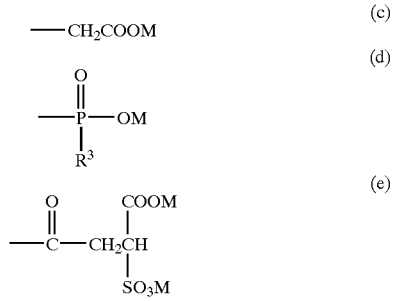

(c)

(d)

(e)

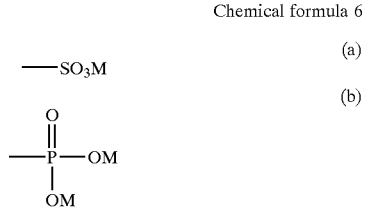

wherein, in chemical formula 6, Ms each are independently an alkali metal, NH$_4$ or an alkanolamine residue, and R$^3$s each are independently a residue other than X in chemical formula 4 or 5.

Since the surface-active agent composition and the emulsifying agent composition for aqueous resin dispersion according to the present invention comprise the polymerizable monomer surface active agent represented by the general formula (I) as chemical formula 1 and the polymerizable dimer surface active agent represented by the general formula (II) as chemical formula 2, they provide for an emulsion exhibiting satisfactory mechanical stability and polymerization stability when they are used in an aqueous-system emulsion polymerization of an ethylenic unsaturated monomer. What is more, they are polymerizable with such an ethylenic unsaturated monomer and hence ensure a film having excellent characteristics. More specifically, use of an emulsion polymer prepared using the surface-active agent composition of the present invention makes it possible to yield a film that is excellent in water resistance, peel strength, adhesion retention and the like.

The foregoing and other objects, features and attendant advantages of the present invention will become apparent from the reading of the following detailed description in conjunction with the accompanying drawings.

DETAILED DESCRIPTION OF THE PREFERRED EMBODIMENTS

Figure 1:
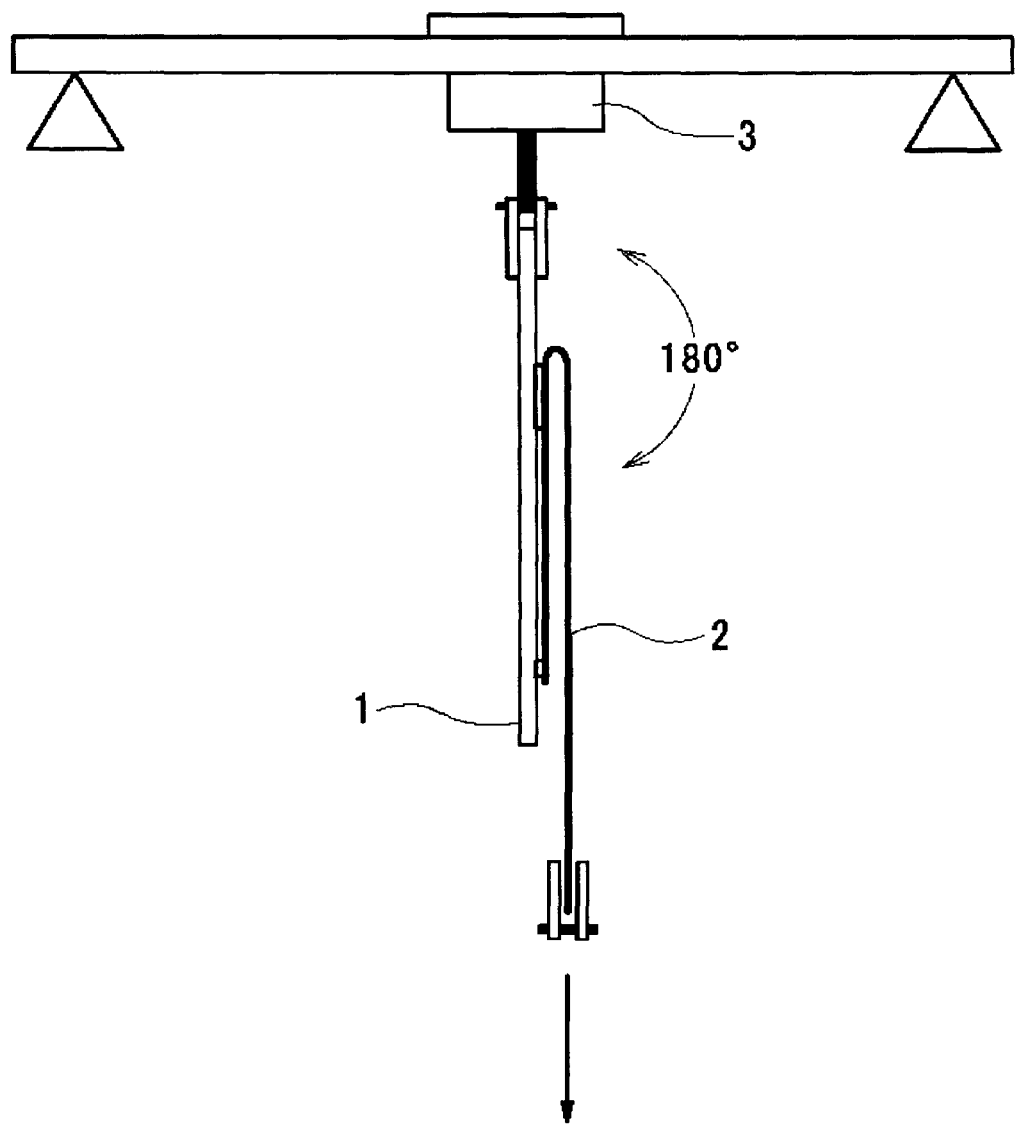
FIG. 1 is a view illustrating a method of testing peel strength.

In the aforementioned chemical formulae 1, 2, 4 and 5, R$^1$s each are independently an alkyl group having 8 to 30 carbon atoms, examples of which include octyl group, nonyl group, decyl group, undecyl group, dodecyl group, tridecyl group, tetradecyl group, pentadecyl group, hexadecyl group, heptadecyl group, octadecyl group, nonadecyl group, and eicosyl group, or mixtures thereof. R$^1$ in chemical formula 1 and R$^1$ in chemical formula 2 may be the same or different. If R$^1$s in chemical formulae 1 and 2 are the same, there is an advantage that the monomer surface active agent of chemical formula 1 and the dimer surface active agent of chemical formula 2 can be prepared at the same time through a one-time reaction if the reaction conditions are adjusted. Likewise, R$^1$ in chemical formula 4 and R$^1$ in chemical formula 5 may be the same or different. If R$^1$s in chemical formulae 4 and 5 are the same, there is an advantage that the monomer surface active agent of chemical formula 4 and the dimer surface active agent of chemical formula 5 can be prepared at the same time through a one-time reaction if the reaction conditions are adjusted.

As described above, A is an alkylene group having 2 to 4 carbon atoms or a substituted alkylene group. Examples of such alkylene groups include ethylene, propylene, butylene, and isobutylene. Such an alkylene group may be a mixture of single alkylene groups or a mixture of block or random adducts thereof. In the same way as above, As in chemical formulae 1 and 2 may be the same or different. If As in chemical formulae 1 and 2 are the same, there is an advantage that the monomer surface active agent of chemical formula 1 and the dimer surface active agent of chemical formula 2 can be prepared at the same time through a one-time reaction if the reaction conditions are adjusted. Likewise, As in chemical formulae 4 and 5 may be the same or different. If As in chemical formulae 4 and 5 are the same, there is an advantage that the monomer surface active agent of chemical formula 4 and the dimer surface active agent of chemical formula 5 can be prepared at the same time through a one-time reaction if the reaction conditions are adjusted.

In chemical formulae 1, 2, 4 and 5, n is an integer from 0 to 200, preferably from 0 to 100. The value of n that is not greater than 200 is not preferable because the resulting composition has lowered surface activity.

As described above, X is hydrogen or any one of substituents represented by chemical formula 3 or 6, while M in chemical formula 3 or 6 is an alkali metal atom such as sodium or potassium, $NH_4$ or an alkanolamine residue of monoethanolamine, triethanolamine or the like, or a mixture thereof. In the same way as above, Xs in chemical formulae 1 and 2 may be the same or different. If Xs in chemical formulae 1 and 2 are the same, there is an advantage that the monomer surface active agent of chemical formula 1 and the dimer surface active agent of chemical formula 2 can be prepared at the same time through a one-time reaction if the reaction conditions are adjusted. Likewise, Xs in chemical formulae 4 and 5 may be the same or different. If Xs in chemical formulae 4 and 5 are the same, there is an advantage that the monomer surface active agent of chemical formula 4 and the dimer surface active agent of chemical formula 5 can be prepared at the same time through a one-time reaction if the reaction conditions are adjusted.

The monomer surface active agent of chemical formula 1 or 4 and the dimer surface active agent of chemical formula 2 or 5 in the surface-active agent and the emulsifying agent for aqueous resin dispersion according to the present invention can be industrially easily prepared in the following manner for example.

First, á-olefin oxide (for example, AOE-X24 produced by DAICEL CHEMICAL INDUSTRIES LTD., number of carbon atoms: 12 and 14) and allyl alcohol are heated to react with each other in the presence of a catalyst. In this case, if the amounts of á-olefin oxide and allyl alcohol are equimolar in molar ratio or if the amount of allyl alcohol is larger than the amount of á-olefin oxide in molar ratio, the monomer surface active agent of chemical formula 1 or 4 is produced predominantly, while if the amount of á-olefin oxide is larger than the amount of allyl alcohol in molar ratio, the dimer surface active agent of chemical formula 2 or 5 is produced in an increased amount. The ratio between the content of the monomer surface active agent and the content of the dimmer surface active agent in each composition of the present invention can be varied by a process (1) of adjusting the molar ratio between á-olefin oxide and allyl alcohol. Alternatively, it is possible to vary the aforementioned ratio as desired by a process (2) including: separately causing the equimolar or allyl alcohol-excess reaction for predominantly producing the monomer surface active agent and the reaction at the molar ratio for producing an increased proportion of the dimer surface active agent; and adjusting the mixing ratio of the reaction products of respective reactions, or by a process (3) including: separately causing the equimolar or allyl alcohol-excess reaction for predominantly producing the monomer surface active agent and the reaction at the molar ratio for producing an increased proportion of the dimer surface active agent; then fractionating the monomer surface active agent and the dimer surface active agent by preparative liquid chromatography; and adjusting the mixing ratio of the agents thus fractionated. In the case of process (1), that is, the case where the monomer surface active agent and the dimer surface active agent are obtained at the same time through a one-time reaction, $R^1$s in chemical formulae 1 and 2 are the same. In the case of processes (2) and (3), that is, the case where the monomer surface active agent and the dimer surface active agent are obtained through separate reactions and then mixed together, $R^1$s in chemical formulae 1 and 2 can be rendered the same or different. Likewise, in the case of process (1) where the monomer surface active agent and the dimer surface active agent are obtained at the same time through a one-time reaction, $R^1$s in chemical formulae 4 and 5 are the same. In the case of processes (2) and (3) where the monomer surface active agent and the dimer surface active agent are obtained through separate reactions and then mixed together, $R^1$s in chemical formulae 4 and 5 can be rendered different. The following description is made on condition that products of addition reaction between á-olefin oxide and allyl alcohol become a mixture through any one of the aforementioned processes. However, even in the case where the monomer surface active agent and the dimer surface active agent are obtained through separate reactions, it is possible to obtain the monomer surface active agent and the dimer surface active agent eventually if the same reaction as in the following description is caused to take place. In this case, $R^1$s, $R^2$s, As and Xs in chemical formula 1 and 2 can be rendered different respectively.

If n is 0 and X is hydrogen in chemical formulae 1, 2, 4 and 5, addition reaction between á-olefin oxide and allyl alcohol gives the intended composition. However, if n is not 0, the resulting adduct is further subjected to addition reaction with alkylene oxide by a conventional method to give the intended composition.

If X is a substituent (a) in chemical formulae 3 and 6, the alkylene oxide adduct obtained as above is subjected to sulfation with a sulfating agent such as sulfuric acid or sulfamic acid and then to an optional neutralization with a basic substance to give the composition of the present invention.

If X is a substituent (b) in chemical formulae 3 and 6, the alkylene oxide adduct is allowed to react with phosphoric anhydride ($P_2O_5$) and then subjected to optional neutralization with an alkaline substance to give the composition of the present invention.

If X is a substituent (c) in chemical formulae 3 and 6, the hydroxyl group of the alkylene oxide adduct is oxidized to give the composition of the present invention. Alternatively, the alkylene oxide adduct may be carboxylated by reaction with halogenated acetic acid and then subjected to optional neutralization to give the composition of the present invention.

If X is a substituent (d) in chemical formulae 3 and 6, the alkylene oxide adduct is allowed to react with phosphoric anhydride ($P_2O_5$) and then subjected to optional neutralization with an alkaline substance to give the composition of the present invention, as in the case of the substituent (b).

If X is a substituent (e) in chemical formulae 3 and 6, the alkylene oxide adduct is allowed to react with maleic anhydride and subjected to neutralization and then to sulfonation with sodium bisulfite, sodium sulfite or the like to give the composition of the present invention.

The surface-active agent composition and the emulsifying agent for aqueous resin dispersion according to the present invention are usable with the following monomers and the like. That is, for example, acrylic monomers such as acrylic acid, methyl acrylate, butyl acrylate, 2-ethylhexyl acrylate, methyl methacrylate, acrylonitrile, acrylamide, and hydroxyethyl acrylate; aromatic monomers such as styrene and divinylbenzene; vinyl ester monomers such as vinyl acetate; halogen-containing monomers such as vinyl chloride and vinylidene chloride; conjugated diene monomers such as butadiene, isoprene, chloroprene; and other various monomers such as ethylene, maleic anhydride, and methyl maleate. The compositions of the present invention are also usable with mixtures of one or two or more of these monomers.

Any conventionally known polymerization initiator can be used in emulsion polymerization of a monomer in which the composition of the present invention is used. Examples of such polymerization initiators include hydrogen peroxide, potassium persulfate, ammonium persulfate, azobisisobutyronitrile, and benzoyl peroxide.

A polymerization promoter, such as sodium bisulfite or ammonium ferrous sulfate, may also be used.

The composition of the present invention is used in an amount of from 0.1% to 20% by weight, preferably from 0.2% to 5.0% by weight, relative to the total amount of monomer(s).

Though the composition of the present invention, even when used alone, can provide for favorable aqueous resin dispersions, it may be used in combination with other emulsion or a protective colloid material.

An aqueous resin dispersion obtained with use of the emulsifying agent of the present invention may be used as a binder for printing ink, paint or the like, an adhesive, pressure sensitive adhesive, coating material, impregnating reinforcement and the like for wood, metal, paper, cloth, plastics, ceramics, concrete and other materials.

Hereinafter, the present invention will be described specifically by way of examples, which are not construed to limit the scope of the present invention. It should be noted that "%" and "part(s)" used in this specification mean % by weight and part(s) by weight, respectively.

EXAMPLE 1

Dimer Surface Active Agent Content: 2.3%

A reactor equipped with a stirrer, a thermometer and a reflux tube was charged with 64 g of allyl alcohol and 0.3 g of caustic soda as a catalyst, then 196 g of AOE-X24 (á-olefin oxide having 12 and 14 carbon atoms, produced by DAICEL CHEMICAL INDUSTRIES LTD.) was dropped into the reactor, and the resulting mixture was stirred at 90° C. for 10 hours. Thereafter, the mixture was heated to 110° C. to remove away excess allyl alcohol under reduced pressure.

Subsequently, 257 g of the resulting crude reaction product was transferred into an autoclave and then allowed to react with 220 g of ethylene oxide under the conditions: pressure=2.0 kg/cm$^2$, temperature=130° C., to give an adduct with 5 mol ethylene oxide.

477 g of the 5 mol ethylene oxide adduct was sulfated using 97 g of sulfamic acid at 120° C. for 5 hours to give a crude reaction product as composition A.

EXAMPLE 2

Dimer Surface Active Agent Content: 2.1%

In the same manner as in Example 1, AOE-X24 (á-olefin oxide) was addition-reacted with allyl alcohol, and then the resulting reaction product was addition-reacted with 10 mol ethylene oxide under the same temperature and pressure conditions as in Example 1. Further, the resulting 10 mol ethylene oxide adduct was sulfated using sulfamic acid in the same manner as in Example 1 to give a crude reaction product as composition B.

EXAMPLE 3

Dimer Surface Active Agent Content: 7.0%

A reactor equipped with a stirrer, a thermometer and a reflux tube was charged with 58 g of allyl alcohol and 0.3 g of caustic soda as a catalyst, then 196 g of AOE-X24 (á-olefin oxide having 12 and 14 carbon atoms, produced by DAICEL CHEMICAL INDUSTRIES LTD.) was dropped into the reactor, and the resulting mixture was allowed to react by stirring at 110° C. for 10 hours. Thereafter, excess allyl alcohol was removed away under reduced pressure.

Subsequently, 264 g of the resulting crude reaction product was transferred into an autoclave and then allowed to react with 220 g of ethylene oxide under the conditions: pressure=2.0 kg/cm$^2$, temperature=130° C., to give an adduct with 5 mol ethylene oxide.

In turn, 484 g of the 5 mol ethylene oxide adduct was sulfated using 97 g of sulfamic acid at 120° C. for 5 hours to give a crude reaction product as composition C.

EXAMPLE 4

Dimer Surface Active Agent Content: 6.5%

In the same manner as in Example 3, AOE-X24 (á-olefin oxide) was addition-reacted with allyl alcohol and then the resulting reaction product was addition-reacted with 10 mol ethylene oxide under the same temperature and pressure conditions as in Example 3. Further, the resulting 10 mol ethylene oxide adduct was sulfated using sulfamic acid in the same manner as in Example 3 to give a crude reaction product as composition D.

EXAMPLE 5

Dimer Surface Active Agent Content: 25.4%

A reactor equipped with a stirrer, a thermometer and a reflux tube was charged with 46 g of allyl alcohol and 0.4 g of caustic soda as a catalyst, then 342 g of AOE-Y08 (á-olefin oxide, number of carbon atoms: 20, 22, 24, 26, 28 and 30, produced by DAICEL CHEMICAL INDUSTRIES LTD.) was dropped into the reactor, and the resulting mixture was allowed to react by stirring at 90° C. for 10 hours. Thereafter, the mixture was heated to 110° C. to remove away excess allyl alcohol under reduced pressure.

Subsequently, 464 g of the resulting crude reaction product was transferred into an autoclave and then allowed to react with 220 g of ethylene oxide under the conditions: pressure=2.0 kg/cm$^2$, temperature=130° C., to give an adduct with 5 mol ethylene oxide.

In turn, 684 g of the 5 mol ethylene oxide adduct was sulfated using 97 g of sulfamic acid at 120° C. for 5 hours to give a crude reaction product as composition E.

EXAMPLE 6

Dimer Surface Active Agent Content: 24.0%

In the same manner as in Example 5, AOE-Y08 (á-olefin oxide) was addition-reacted with allyl alcohol, and then the resulting reaction product was addition-reacted with 10 mol ethylene oxide under the same temperature and pressure conditions as in Example 5. Further, the resulting 10 mol ethylene oxide adduct was sulfated using sulfamic acid in the same manner as in Example 5 to give a crude reaction product as composition F.

EXAMPLE 7

Dimer Surface Active Agent Content: 62.2%

Addition reaction of á-olefin oxide with allyl alcohol was allowed to take place in the same manner as in Example 5 except that AOE-X24 was used as á-olefin oxide, then excess allyl alcohol was removed away under reduced pressure, and the resulting product was separated into a monomer intermediate of the chemical formula 7 and a dimer intermediate of the chemical formula 8 by GPC-mode preparative liquid chromatography.

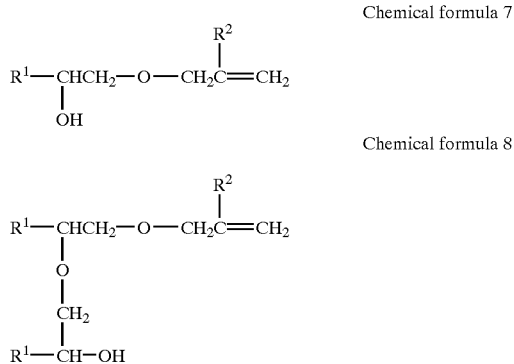

Chemical formula 7

Chemical formula 8 wherein, in chemical formulae 7 and 8, R$^1$s are an alkyl group having 10 carbon atoms and an alkyl group having 12 carbon atoms, respectively, and R$^2$s are each hydrogen. 30% by weight of the monomer intermediate of chemical formula 7 and 70% by weight of the dimer intermediate of chemical formula 8 thus separated were mixed together, and 3.7 g of the resulting mixture was addition-reacted with 10 mol ethylene oxide with use of 0.01 g of caustic soda as a catalyst by a conventional method (pressure=2.0 kg/cm$^2$, temperature=130° C.). Subsequently, 8.07 g of the resulting 10 mol ethylene oxide adduct was sulfated using 0.97 g of sulfamic acid to give a crude reaction product as composition G.

EXAMPLE 8

Adduct With 30 mol Ethylene Oxide 264 g of a crude reaction product (containing 91% by weight of a monomer intermediate and 9% by weight of a dimmer intermediate) obtained in the same manner as in Example 3 was transferred into an autoclave and then addition-reacted with 30 mol ethylene oxide under the conditions: pressure=2.0 kg/cm$^2$, temperature=130° C., to give a composition H as an example of the present invention.

EXAMPLE 9

Sodium Phosphoric Ester 264 g of a crude reaction product (containing 91% by weight of a monomer intermediate and 9% by weight of a dimmer intermediate) obtained in the same manner as in Example 3 was transferred into an autoclave and then addition-reacted with 10 mol ethylene oxide under the conditions: pressure=2.0 kg/cm$^2$, temperature=130° C.

Subsequently, 704 g of the resulting 10 mol ethylene oxide adduct was subjected to phosphate-esterification with use of 47 g of phosphoric anhydride at 80° C. for 5 hours and then neutralized with caustic soda to give a composition I as an example of the present invention. In the composition I, X group in chemical formulae 1 and 2 is a mixture of 55% by weight of a monoester of the substituent (b) and 45% by weight of a diester of the substituent (d).

EXAMPLE 10

Ether Carboxylate 264 g of a crude reaction product (containing 91% by weight of a monomer intermediate and 9% by weight of a dimer intermediate) obtained in the same manner as in Example 3 was transferred into an autoclave and then addition-reacted with 10 mol ethylene oxide under the conditions: pressure=2.0 kg/cm$^2$, temperature=130° C.

Subsequently, a reactor was charged with 704 g of the resulting 10 mol ethylene oxide adduct and then charged with 117 g of sodium monochloroacetate in a powdery state in 30 minutes at room temperature with stirring. Next, 44 g of sodium hydroxide in a powdery state was added to the resulting mixture in 3 hours with the reactor maintained at 40° C. Thereafter, the resulting mixture was allowed to react at 40° C. for 17 hours.

In turn, the reaction product was neutralized with 75% phosphoric acid and then washed with 400 ml of methylene chloride and 200 ml of water. Further, the product was washed with 200 ml of water twice, and then methylene chloride forming an organic layer was distilled off. The reaction composition left was neutralized to pH 8 with 48% sodium hydroxide to give a composition J as an example of the present invention.

EXAMPLE 11

Sodium Sulfosuccinate 264 g of a crude reaction product (containing 91% by weight of a monomer intermediate and 9% by weight of a dimer intermediate) obtained in the same manner as in Example 3 was transferred into an autoclave and then addition-reacted with 10 mol ethylene oxide under the conditions: pressure=2.0 kg/cm$^2$, temperature=130° C.

Subsequently, 704 g of the resulting 10 mol ethylene oxide adduct was subjected to an esterification reaction with 100 g of maleic anhydride at 80° C. for 2 hours. Thereafter, 300 g of water was added to this reaction mixture and then neutralized with an aqueous solution of sodium hydroxide at an internal temperature of 30° C. or lower. Further, the resulting mixture was subjected to a sulfonation reaction at 70° C. for 3 hours by introduction of 120 g of sodium bisulfite to give a composition K as an example of the present invention.

EXAMPLE 12

Sulfate not Containing Ethylene Oxide 264 g of a crude reaction product (containing 91% by weight of a monomer intermediate and 9% by weight of a dimer intermediate) obtained in the same manner as in Example 3 was sulfated with 97 g of sulfamic acid to give a crude reaction product as a composition L.

Emulsion Polymerization Test

Emulsion polymerization was carried out under the following conditions using a composition of formulation A (styrene/butyl acrylate formulation) or formulation B (2-ethylhexyl acrylate/butyl acrylate formulation) in which any one of the compositions obtained in the foregoing Examples 1 to 12 and other emulsifying agent compositions for comparison was used. The emulsifying agents used were those shown in Tables 2 to 5 at emulsifying agent composition columns.

Formulation A . . . Styrene/Butyl Acrylate Formulation

A reactor equipped with a stirrer, a reflux condenser, a thermometer and a dropping funnel was charged with 293.6 g (289.6 g in test example 8 and comparative test example 4) of distilled water and heated to 80° C., and then dissolved oxygen in the distilled water was removed away using nitrogen gas.

Separately from this procedure, a monomer containing an emulsifying agent was prepared by mixing 99 g of styrene, 99 g of butyl acrylate, 2 g of acrylic acid, and 6 g (10.0 g in test example 8 and comparative test example 4) of any one of the emulsifying agents shown in Tables 2 and 3.

In turn, 40 g of the emulsion-containing monomer thus prepared was put into the reactor at a time, stirred for 10 minutes, and then admixed with 0.4 g of ammonium persulfate as a polymerization initiator, followed by stirring for 10 minutes. Subsequently, the rest of the emulsion-containing monomer was dropped into the reactor in 3 hours to allow a polymerization reaction to proceed to give an emulsion polymer.

Formulation B . . . 2-ethylhexyl Acrylate/Butyl Acrylate Formulation

A reactor equipped with a stirrer, a reflux condenser, a thermometer and a dropping funnel was charged with 293.6 g (289.6 g in test example 8 and comparative test example 4) of distilled water and heated to 80° C., and then dissolved oxygen in the distilled water was removed away using nitrogen gas.

Separately from this procedure, a monomer containing an emulsifying agent was prepared by mixing 100 g of 2-ethylhexyl acrylate, 100 g of butyl acrylate, and 6 g (10.0 g in test example 8 and comparative test example 4) of any one of the emulsifying agents shown in Tables 2 and 3.

In turn, 40 g of the emulsion-containing monomer thus prepared was put into the reactor at a time, stirred for 10 minutes, and then admixed with 0.4 g of ammonium persulfate as a polymerization initiator, followed by stirring for 10 minutes. Subsequently, the rest of the emulsion-containing mononer was dropped into the reactor in 3 hours to allow a polymerization reaction to proceed to give an emulsion polymer.

TABLE 1

| Ingredients | Weight (g) Formulation A (styrene/butyl acrylate formulation) | Formulation B (2-ethylhexyl acrylate/ butyl acrylate formulation) |
|---|---|---|
| 2-Ethylhexyl acrylate | — | 100 |
| Styrene | 99 | — |
| Butyl acrylate | 99 | 100 |
| Acrylic acid | 2 | — |
| Ammonium persulfate | 0.4 | 0.4 |
| Emulsifying agent[*1] | 6.0[*2] | 6.0[*2] |
| Distilled water | 293.6[*3] | 293.6[*3] |
| Total | 500.0 | 500.0 |

[*1]Any one of those shown in Tables 2 and 3 at emulsifying agent composition columns was used.
[*2]The amount of each of the emulsifying agent compositions used in Test Example 8 shown in Table 2 and comparative Test Example 4 shown in Table 3 was 10 g.
[*3]The amount of distilled water used with each of the emulsifying agents used in Test Example 8 shown in Table 2 and Comparative Test Example 4 shown in Table 3 was 289.6 g.
Polymerization conditions: monomer dropping method, temperature . . . 80° C., dropping period . . . 3 hours, aging period . . . 1 hour, emulsifying agent . . . wholly dissolved in monomer.

TABLE 2

| | Emulsifying agent composition | Test Results of Formulation A | | | |
|---|---|---|---|---|---|
| | | Amount of agglomerate (wt %) | Mechanical stability (%) | Water resistance (h) | Uncopolymerized emulsifying agent (%) |
| Test Example 1 | Composition A (Example 1) Dimer active agent: 2.3 wt % EO . . . 5 mol | 0.04 | 0.04 | 300 or more | 14.5 |

TABLE 2-continued

Test Results of Formulation A

| | Emulsifying agent composition | Amount of agglomerate (wt %) | Mechanical stability (%) | Water resistance (h) | Uncopolymerized emulsifying agent (%) |
|---|---|---|---|---|---|
| Test Example 2 | Composition B (Example 2) Dimer active agent: 2.1 wt % EO . . . 10 mol added Ammonium sulfuric ester | 0.02 | 0.03 | 300 or more | 18.3 |
| Test Example 3 | Composition C (Example 3) Dimer active agent: 7.0 wt % EO . . . 5 mol added Ammonium sulfuric ester | 0.03 | 0.02 | 300 or more | 20.8 |
| Test Example 4 | Composition D (Example 4) Dimer active agent: 6.5 wt % EO . . . 10 mol added Ammonium sulfuric ester | 0.03 | 0.00 | 300 or more | 21.6 |
| Test Example 5 | Composition E (Example 5) Dimer active agent: 25.4 wt % EO . . . 5 mol added Ammonium sulfuric ester | 0.08 | 0.05 | 300 or more | 16.0 |
| Test Example 6 | Composition F (Example 6) Dimer active agent: 24.0 wt % EO . . . 10 mol added Ammonium sulfuric ester | 0.05 | 0.07 | 300 or more | 19.1 |
| Test Example 7 | Composition G (Example 7) Dimer active agent: 62.2 wt % EO . . . 10 mol added Ammonium sulfuric ester | 0.07 | 0.08 | 300 or more | 21.8 |
| Test Example 8 | Composition H (Example 8) Dimer active agent: 5.9 wt % EO . . . 30 mol added Nonoionic | 1.10 | 0.22 | 300 or more | 12.6 |
| Test Example 9 | Composition I (Example 9) Dimer active agent: 6.5 wt % EO . . . 10 mol added Sodium phosphoric | 0.11 | 0.09 | 300 or more | 20.5 |

TABLE 2-continued

Test Results of Formulation A

| | Emulsifying agent composition | Amount of agglomerate (wt %) | Mechanical stability (%) | Water resistance (h) | Uncopolymerized emulsifying agent (%) |
|---|---|---|---|---|---|
| Test Example 10 | ester Composition J (Example 10) Dimmer active agent: 6.5 wt % EO . . . 10 mol added Sodium ether carboxylate | 0.06 | 0.04 | 300 or more | 17.8 |
| Test Example 11 | Composition K (Example 11) Dimer active agent: 6.5 wt % EO . . . 10 mol added Sodium sulfo-succinate | 0.04 | 0.07 | 300 or more | 16.8 |
| Test Example 12 | Composition L (Example 12) Dimer active agent: 8.0 wt % EO . . . 0 mol added Ammonium sulfuric ester | 0.14 | 0.08 | 300 or more | 13.0 |

TABLE 3

Comparative Test Results of formulation A

| | Emulsifying agent composition | Amount of agglomerate (wt %) | Mechanical stability (%) | Water resistance (h) | Uncopolymerized emulsifying agent (%) |
|---|---|---|---|---|---|
| Comparative Test Example 1 | Monomer active agent only Dimer active agent: 0 wt % EO . . . 10 mol added Ammonium sulfuric ester | 1.86 | 0.38 | 48 | 34.2 |
| Comparative Test Example 2 | Nonyl phenol ether EO . . . 10 mol added Ammonium sulfuric ester | 0.25 | 0.46 | 4 | 100 |
| Comparative Test Example 3 | Sodium dodecylbenzene sulfonate | 0.88 | 0.55 | 2 | 100 |
| Comparative Test Example 4 | Nonyl phenol ether Nonionic | 1.00 | 4.65 | 3 | 100 |

Using each of the emulsion polymers thus obtained, the amount of agglomerate (emulsion stability) was measured, and further the mechanical stability of emulsion was measured. In turn, a film was formed from each emulsion polymer, and its water resistance, peel strength and adhesion retention and the amount of uncopolymerized emulsifying agent contained in the film were measured. The results of the measurements are shown as test examples and comparative test examples in Tables 2 to 5.

Test methods employed for the items of Tables 2 to 5 are as follows.

(Amount of Agglomerate)

After having undergone emulsion polymerization, each of the emulsions of the aforementioned test examples and comparative test examples was filtered with 150-mesh metal gauze, and the residue on the metal gauze was dried at 105° C. and then weighed. The weight thus measured is expressed in wt % relative to the total weight of monomers.

(Mechanical Stability)

50 g of each emulsion was stirred for 5 minutes with a Merlon-type tester at 1,000 rpm under a load of 10 kg, and agglomerate resulting therefrom was filtered with 150-mesh metal gauze. The residue was washed with water and dried.

The weight of the residue thus dried is expressed in % relative to the solid content of the emulsion.

(Water Resistance)

A 0.5 mm-thick polymer film was formed on a glass plate and immersed in water. The time period from the immersion until a 4.5-point character became illegible through the film was measured.

(Peel Strength)

As shown in FIG. 1, each of the emulsions of the aforementioned test examples and comparative test examples was applied onto a PET film 2 so that the resulting coating film would have a thickness of 25 ìm when dried, and the PET film coated with the emulsion was bonded to a SUS plate 1 to form a test piece. The width of the bonding surface was 50 mm. The length of the bonding surface does not influence on a measured value. Subsequently, the SUS plate 1 as the test piece was suspended from a load cell 3, and PET film 2 was pulled under the conditions: 25° C., angle=180°, and a speed=300 mm/min to measure the peel strength. The tester used in this test was AUTOGRAPH AG-A manufactured by Shimadzu Corporation.

(Adhesion Retention)

Figure 2:
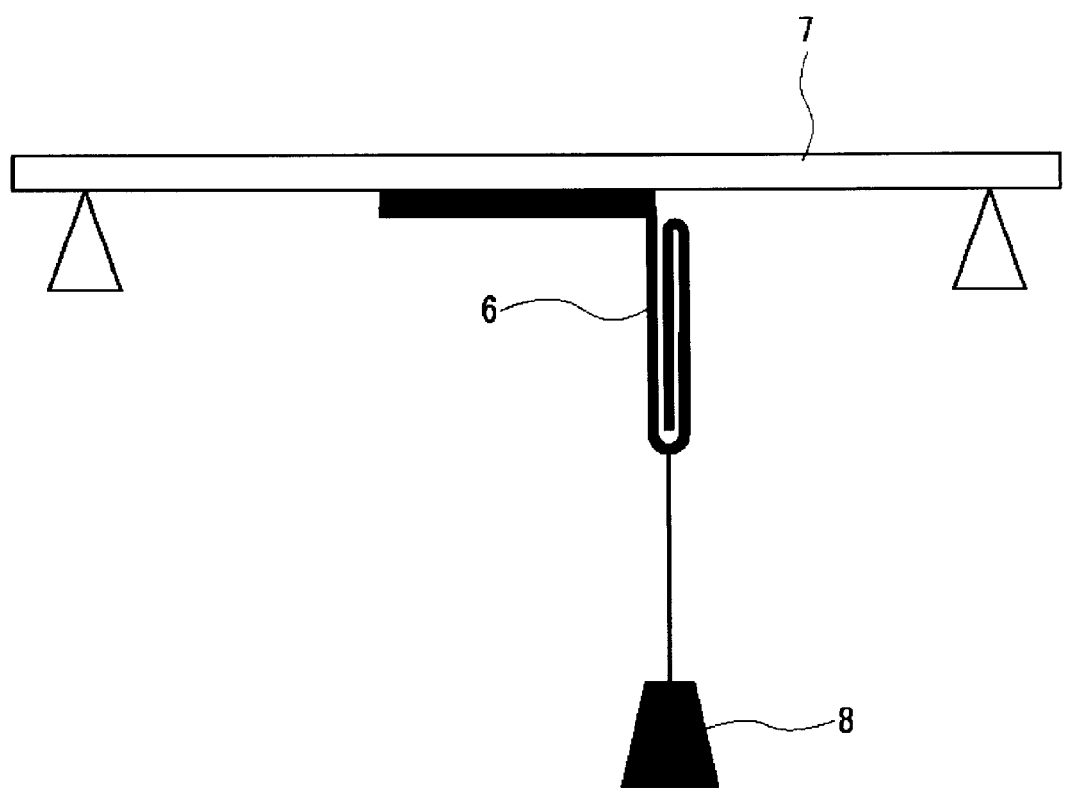
FIG. 2 is a view illustrating a method of testing adhesion retention.

As shown in FIG. 2, each of the emulsion polymers of the aforementioned test examples and comparative test examples was applied onto a PET film 6 so that the resulting coating film would have a thickness of 25 ìm when dried, and the PET film coated with the emulsion was bonded to a SUS plate 7. The bonding surface was 50 mm×50 mm. A weight 8 of 200 g was suspended from the PET film 6 to measure a time period (sec) until the film 6 was entirely peeled off. The tester used in this test was AUTOGRAPH AG-A manufactured by Shimadzu Corporation.

(Amount of Uncopolymerized Emulsion)

Methanol was added to each of the emulsion polymers of the aforementioned test examples and comparative test examples to give a mixture having a volume of 10 ml, which in turn was subjected to centrifugal separation at 2,000 rpm. Subsequently, the amount of emulsion contained in the resulting supernatant liquor was measured. In the case of the nonionic emulsifying agents used in test example 8 and comparative test example 4, the amount of emulsion in supernatant liquor was measured by GPC column chromatography, while in the case of the anionic emulsifying agents used in other test examples and comparative test examples, the amount of emulsion in supernatant liquor was measured by Epton titration method.

TABLE 4

Test Results of Formulation B

| | Emulsifying agent composition | Amount of agglomerate (wt %) | Mechanical stability (%) | Water resistance (h) | Peel strength (g/50 mm) | Adhesion retention (sec) | Uncopolymerized emulsion (%) |
|---|---|---|---|---|---|---|---|
| Test Example 1 | Composition A (Example 1) Dimer active agent: 2.3 wt % EO . . . 5 mol added Ammonium sulfuric ester | 0.08 | 0.03 | 300 or more | 800 | 250 | 11.5 |
| Test Example 2 | Composition B (Example 2) Dimer active agent: 2.1 wt % EO . . . 10 mol added Ammonium sulfuric ester | 0.05 | 0.08 | 300 or more | 900 | 230 | 15.3 |
| Test Example 3 | Composition C (Example 3) Dimer active agent: 7.0 wt % EO . . . 5 mol added Ammonium sulfuric ester | 0.04 | 0.04 | 300 or more | 880 | 210 | 17.8 |
| Test Example 4 | Composition D (Example 4) Dimer active agent: 6.5 wt % EO. . . 10 mol added Ammonium | 0.04 | 0.02 | 300 or more | 850 | 254 | 18.6 |

TABLE 4-continued

Test Results of Formulation B

| | Emulsifying agent composition | Amount of agglomerate (wt %) | Mechanical stability (%) | Water resistance (h) | Peel strength (g/50 mm) | Adhesion retention (sec) | Uncopolymerized emulsion (%) |
|---|---|---|---|---|---|---|---|
| Test Example 5 | sulfuric ester Composition E (Example 5) Dimer active agent: 25.4 wt % EO . . . 5 mol added | 0.07 | 0.07 | 300 or more | 820 | 210 | 13.3 |
| Test Example 6 | Ammonium sulfuric ester Composition F (Example 6) active agent: 24.0 wt % EO . . . 10 mol added | 0.08 | 0.06 | 300 or more | 800 | 230 | 16.2 |
| Test Example 7 | Ammonium sulfuric ester Composition G (Example 7) active agent: 62.2 wt % EO . . . 10 mol added | 0.09 | 0.12 | 300 or more | 900 | 255 | 19.9 |
| Test Example 8 | Ammonium sulfuric ester Composition H (Example 8) Dimer active agent: 5.9 wt % EO . . . 30 mol added | 1.80 | 0.23 | 300 or more | 810 | 180 | 10.0 |
| Test Example 9 | Nonionic Composition I (Example 9) Dimer active agent: 6.5 wt % EO . . . 10 mol added | 0.08 | 0.16 | 300 or more | 780 | 220 | 17.8 |
| Test Example 10 | Sodium phosphoric ester Composition J (Example 10) Dimer active agent: 6.5 wt % EO . . . 10 mol added | 0.06 | 0.09 | 300 or more | 900 | 200 | 15.3 |
| Test Example 11 | Sodium ether carboxylate Composition K (Example 11) Dimer active agent: 6.5 wt % | 0.07 | 0.07 | 300 or more | 820 | 195 | 13.8 |

TABLE 4-continued

Test Results of Formulation B

| | Emulsifying agent composition | Amount of agglomerate (wt %) | Mechanical stability (%) | Water resistance (h) | Peel strength (g/50 mm) | Adhesion retention (sec) | Uncopolymerized emulsion (%) |
|---|---|---|---|---|---|---|---|
| Test Example 12 | EO ... 10 mol added Sodium sulfo-succinate Composition L (Example 12) Dimer active agent: 8.0 wt % EO ... 0 mol added Ammonium sulfuric ester | 0.08 | 0.85 | 300 or more | 880 | 210 | 10.0 |

TABLE 5

Comparative Test Results of Formulation B

| | Emulsifying agent composition | Amount of agglomerate (wt %) | Mechanical stability (%) | Water resistance (h) | Peel strength (g/50 mm) | Adhesion retention (sec) | Uncopolymerized emulsion (%) |
|---|---|---|---|---|---|---|---|
| Comp. Test Example 1 | Monomer active agent only Dimer active agent: 0 wt % EO ... 10 mol added Ammonium sulfuric ester | 1.50 | 0.93 | 190 | 480 | 90 | 32.0 |
| Comp. Test Example 2 | Nonyl phenol ether EO ... 10 mol added Ammonium sulfuric ester | 0.30 | 2.30 | 5 | 250 | 40 | 100 |
| Comp. Test Example 3 | Sodium dodecyl-benzene sulfonate | 0.25 | 2.60 | 3 | 200 | 50 | 100 |
| Comp. Test Example 4 | Nonyl phenol ether EO ... 30 mol added Nonionic | 3.90 | 3.40 | 7 | 180 | 20 | 100 |

(Results of Tests)

As can be clearly seen from comparison between Tables 2 to 5, emulsion polymers prepared with use of the compositions each containing a polymerizable monomer surface active agent and a polymerizable dimer surface active agent according to the examples of the present invention were excellent in emulsion stability and mechanical strength, and films formed from such emulsion polymers were excellent in water resistance, peel strength and adhesion retention. On the other hand, it turns out that each of the emulsion polymers of the comparative test examples prepared using the compositions not containing any dimer surface active agent contained a large amount of agglomerate, and that films formed from such emulsion polymers were inferior in water resistance, peel strength and adhesion retention. The test results obtained with use of the composition of comparative test example 1 were better than the test results obtained with use of the compositions of comparative examples 2 to 4 not containing any polymerizable surface active agent but were worse than the test results obtained with use of the compositions of the test examples of the present invention each containing a polymerizable dimer surface active agent.

What is claimed is:

1. A surface active agent composition comprising: a polymerizable monomer surface active agent represented by the general formula (I):

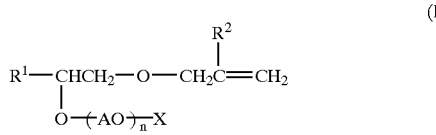

and a polymerizable dimer surface active agent represented by the general formula (II):

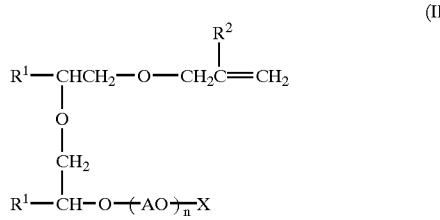

wherein, in the general formulae (I) and (II), $R^1$s each are independently an alkyl group having 8 to 30 carbon atoms, $R^2$s each are independently hydrogen or a methyl group, As each are independently an alkylene group having 2 to 4 carbon atoms or a substituted alkylene group, ns each are independently an integer from 0 to 200, and Xs each are independently hydrogen or one of substituents represented as follows:

—X:

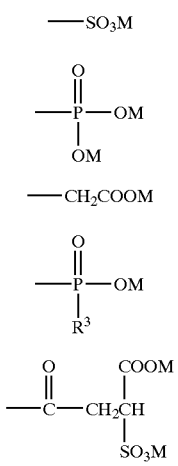

wherein, in the formula of X, Ms each are independently an alkali metal, $NH_4$ or an alkanolamine residue, and $R^3$s each are independently a residue other than X in the general formula (I) or the general formula (II).

2. The surface active agent composition according to claim 1, wherein the weight ratio between the monomer surface active agent represented by the general formula (I) and the dimer surface active agent represented by the general formula (II) is within a range of from 70:30 to 99:1.

3. The surface active agent composition according to claim 1, wherein $R^1$s in the general formulae (I) and (II) each are independently an alkyl group selected from the group consisting of octyl group, nonyl group, decyl group, undecyl group, dodecyl group, tridecyl group, tetradecyl group, pentadecyl group, hexadecyl group, heptadecyl group, octadecyl group, nonadecyl group and eicosyl group, and mixtures thereof.

4. The surface active agent composition according to claim 1, wherein As in the general formulae (I) and (II) each are ethylene, propylene, butylene or isobutylene, or a mixture of block or random adducts thereof.

5. The surface active agent composition according to claim 1, wherein the integers n in the general formulae (I) and (II) each are independently within a range of from 0 to 100.

6. The surface active agent composition according to claim 1, wherein M in the formula of X is an alkali metal atom, an alkanolamine residue, or a mixture thereof.

7. The surface active agent composition according to claim 6, wherein M in the formula of X is a sodium atom, a potassium atom, or a mixture thereof.

8. The surface active agent composition according to claim 1, wherein M in the formula of X is $NH_4$.

9. The surface active agent composition according to claim 6, wherein M in the formula of X is an amine residue of monoethanolamine or an amine residue of triethanolamine, or a mixture thereof.

10. An emulsifying agent composition for aqueous resin dispersion comprising a polymerizable monomer surface active agent represented by the general formula (I):

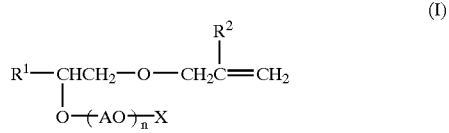

and a polymerizable dimer surface active agent represented by the general formula (II):

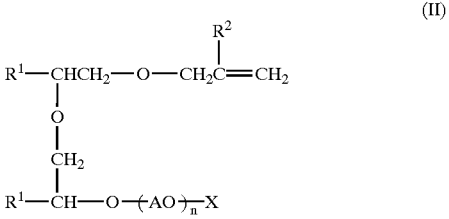

wherein, in the general formulae (I) and (II), $R^1$s each are independently an alkyl group having 8 to 30 carbon atoms, $R^2$s each are independently hydrogen or a methyl group, As each are independently an alkylene group having 2 to 4 carbon atoms or a substituted alkylene group, ns each are independently an integer from 0 to 200, and Xs each are independently hydrogen or one of substituents represented as follows:

—X:

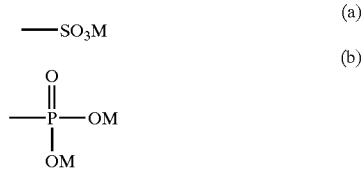

-continued

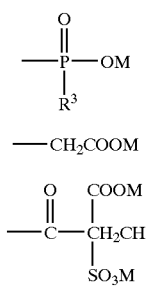

(c)

(d)

(e)

wherein, in the formula of X, Ms each are independently an alkali metal, $NH_4$ or an alkanolamine residue, and $R^3$s each are independently a residue other than X in the general formula (I) or the general formula (II).

11. The emulsifying agent composition for aqueous resin dispersion according to claim 10, wherein the weight ratio between the monomer surface active agent represented by the general formula (I) and the dimer surface active agent represented by the general formula (II) is within a range from 70:30 to 99:1.

12. The emulsifying agent composition for aqueous resin dispersion according to claim 10, wherein $R^1$s in the general formulae (I) and (II) each are independently an alkyl group selected from the group consisting of octyl group, nonyl group, decyl group, undecyl group, dodecyl group, tridecyl group, tetradecyl group, pentadecyl group, hexadecyl group, heptadecyl group, octadecyl group, nonadecyl group and eicosyl group, and mixtures thereof.

13. The emulsifying agent composition for aqueous resin dispersion according to claim 10, wherein As in the general formulae (I) and (II) each are ethylene, propylene, butylene or isobutylene, or a mixture of block or random adducts thereof.

14. The emulsifying agent composition for aqueous resin dispersion according to claim 10, wherein the integers n in the general formulae (I) and (II) each are independently within a range of from 0 to 100.

15. The emulsifying agent composition for aqueous resin dispersion according to claim 10, wherein M in the formula of X is an alkali metal atom, an alkanolamine residue, or a mixture thereof.

16. The emulsifying agent composition for aqueous resin dispersion according to claim 15, wherein M in the formula of X is a sodium atom, a potassium atom, or a mixture thereof.

17. The emulsifying agent composition according to claim 10, wherein N in the formula of X is $NH_4$.

18. The emulsifying agent composition according to claim 15, wherein M in the formula of X is an amine residue of monoethanolamine or an amine residue of triethanolamine, or a mixture thereof.

* * * * *

UNITED STATES PATENT AND TRADEMARK OFFICE
CERTIFICATE OF CORRECTION

PATENT NO.    : 6,649,718 B2
DATED         : November 18, 2003
INVENTOR(S)   : Nishitani et al.

It is certified that error appears in the above-identified patent and that said Letters Patent is hereby corrected as shown below:

Title page,
Item [54], Title, "AQUEOUS RESIN DISPERSION" should be -- WATER SOLUBLE POLYMER DISPERSION --
Item [75], Inventors, "Oumihatiman" should be -- Shiga --

Column 25,
Lines 1-8, Structures (c) and (d) are reversed in order. The structure next to (c) should be (d) and the structure next to (d) should be (c).

Column 26,
Line 22, "N" should be -- M --

Signed and Sealed this

Twentieth Day of April, 2004

JON W. DUDAS
*Acting Director of the United States Patent and Trademark Office*